US011438481B2

(12) United States Patent
Namba et al.

(10) Patent No.: US 11,438,481 B2
(45) Date of Patent: Sep. 6, 2022

(54) IMAGE READING APPARATUS AND IMAGE FORMING APPARATUS COMPRISING A FIRST WALL, A SECOND WALL, A HARNESS INTERPOSED BETWEEN THE FIRST WALL AND SECOND WALL, A THIRD WALL, THE HARNESS NOT INTERPOSED BETWEEN THE FIRST WALL AND THIRD WALL, AND A PLURALITY OF FOURTH WALLS SPACED APART FROM EACH OTHER EXTENDING IN AN ORTHOGONAL DIRECTION ORTHOGONAL TO THE FIRST DIRECTION IN WHICH THE FIRST WALL AND THE THIRD WALL EXTEND AND PROTRUDING UPWARD FROM THE BOTTOM OF THE HARNESS ACCOMMODATING PORTION

(71) Applicant: Brother Kogyo Kabushiki Kaisha, Nagoya (JP)

(72) Inventors: Mamoru Namba, Nagoya (JP); Katsuro Miura, Toyota (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 16/831,015

(22) Filed: Mar. 26, 2020

(65) Prior Publication Data
US 2020/0314282 A1 Oct. 1, 2020

(30) Foreign Application Priority Data
Mar. 28, 2019 (JP) .............................. JP2019-064887

(51) Int. Cl.
H04N 1/10 (2006.01)
H04N 1/12 (2006.01)
(Continued)

(52) U.S. Cl.
CPC ....... *H04N 1/1065* (2013.01); *H04N 1/00816* (2013.01); *H04N 1/00827* (2013.01); *H04N 1/1245* (2013.01)

(58) Field of Classification Search
CPC .......... H04N 1/00816; H04N 1/00827; H04N 1/1065; H04N 1/1245; H04N 1/1017;
(Continued)

(56) References Cited

U.S. PATENT DOCUMENTS 7,161,716 B1* 1/2007 Kawasaki ............ H04N 1/1017
355/75
2005/0281597 A1* 12/2005 Ito .......................... B65H 29/70
399/395

(Continued)

FOREIGN PATENT DOCUMENTS

JP 2000-015893 A 1/2000
JP 2011-136829 A 7/2011
(Continued)

Primary Examiner — Chad Dickerson
(74) Attorney, Agent, or Firm — Burr & Brown, PLLC

(57) ABSTRACT

An image reading apparatus is provided, including a platen glass having opposed upper and lower surfaces, a support frame supporting a peripheral portion of the platen glass, a reading device reciprocable in a first direction and disposed on an inner side of the support frame so as to be nearer to the lower surface than to the upper surface, a guide formed on an inner bottom surface on the inner side of the support frame and extending in the first direction so as to guide reciprocation of the reading device, a controller that controls operations of the reading device, a harness connecting the reading device and the controller to each other, and a harness accommodating portion accommodating the harness and constituted by a groove having a recessed shape, extending in the first direction, and formed at the inner bottom surface at a position located in front of the guide.

9 Claims, 7 Drawing Sheets

(51) Int. Cl.
*H04N 1/00* (2006.01)
*G06F 3/12* (2006.01)

(58) Field of Classification Search
CPC ...... H04N 1/1026; H04N 1/103; H04N 1/193; G03G 15/6573; G03G 21/1695; B65H 29/70
USPC ......... 358/474, 505, 498, 497, 493; 399/395
See application file for complete search history.

(56) References Cited

U.S. PATENT DOCUMENTS

| | | | |
|---|---|---|---|
| 2007/0002397 A1* | 1/2007 | Osakabe | H04N 1/1026 358/474 |
| 2007/0002398 A1* | 1/2007 | Ohama | H04N 1/1017 358/474 |
| 2009/0244655 A1* | 10/2009 | Mukai | H04N 1/1026 358/474 |
| 2012/0206750 A1* | 8/2012 | Murray | H04N 1/0318 358/1.13 |
| 2014/0370207 A1 | 12/2014 | Sekiguchi et al. | |
| 2018/0183945 A1* | 6/2018 | Ogawa | G03G 21/1661 |

FOREIGN PATENT DOCUMENTS

| | | | |
|---|---|---|---|
| JP | 2011-205178 A | | 10/2011 |
| JP | 2011205178 A | * | 10/2011 |
| JP | 2013-166930 A | | 8/2013 |
| JP | 2016-015573 A | | 1/2016 |

* cited by examiner

IMAGE READING APPARATUS AND IMAGE FORMING APPARATUS COMPRISING A FIRST WALL, A SECOND WALL, A HARNESS INTERPOSED BETWEEN THE FIRST WALL AND SECOND WALL, A THIRD WALL, THE HARNESS NOT INTERPOSED BETWEEN THE FIRST WALL AND THIRD WALL, AND A PLURALITY OF FOURTH WALLS SPACED APART FROM EACH OTHER EXTENDING IN AN ORTHOGONAL DIRECTION ORTHOGONAL TO THE FIRST DIRECTION IN WHICH THE FIRST WALL AND THE THIRD WALL EXTEND AND PROTRUDING UPWARD FROM THE BOTTOM OF THE HARNESS ACCOMMODATING PORTION

CROSS REFERENCE TO RELATED APPLICATION

The present application claims priority from Japanese Patent Application No. 2019-064887, which was filed on Mar. 28, 2019, the disclosure of which is herein incorporated by reference in its entirety.

BACKGROUND

The following disclosure relates to an image reading apparatus configured to read an image on a document, and to an image forming apparatus including the image reading apparatus.

Conventional image forming apparatuses including a reading unit (an image reading apparatus) include the reading unit at an upper portion of the image forming apparatus and include an image forming device below the reading unit.

The reading unit includes a platen glass disposed under an uppermost cover member. The reading unit is configured such that a reading device reciprocating in the right and left direction reads an image formed on a document placed on the platen glass, for example.

SUMMARY

In the above-described conventional image forming apparatus, in the case where the reading unit reads a predetermined page of a document such as a book, a user places the document such as the book on the platen glass and presses the document against the platen glass in a state in which the predetermined page is open. Thus, the stiffness is required for a structure for supporting the platen glass.

Accordingly, an aspect of the disclosure relates to an image reading apparatus and an image forming apparatus with improved stiffness of a structure for supporting a platen glass.

In one aspect of the disclosure, an image reading apparatus includes: a platen glass having an upper surface and a lower surface as opposite surfaces, the upper surface being configured to support a document; a support frame supporting a peripheral portion of the platen glass; a reading device reciprocable in a first direction and disposed on an inner side of the support frame so as to be nearer to the lower surface of the platen glass than to the upper surface of the platen glass; a guide formed on an inner bottom surface on the inner side of the support frame and extending in the first direction so as to guide reciprocation of the reading device; a controller configured to control operations of the reading device; a harness connecting the reading device and the controller to each other; and a harness accommodating portion constituted by a groove having a recessed shape, extending in the first direction, and formed at the inner bottom surface at a position located in front of the guide, the harness accommodating portion accommodating the harness.

In another aspect of the disclosure, an image forming apparatus includes: an image reading apparatus including (a) a platen glass having an upper surface and a lower surface as opposite surfaces, the upper surface being configured to support a document, (b) a support frame supporting a peripheral portion of the platen glass, (c) a reading device reciprocable in a first direction and disposed on an inner side of the support frame so as to be nearer to the lower surface of the platen glass than to the upper surface of the platen glass, (d) a guide formed on an inner bottom surface on the inner side of the support frame and extending in the first direction so as to guide reciprocation of the reading device, (e) a controller configured to control operations of the reading device, (f) a harness connecting the reading device and the controller to each other, and (g) a harness accommodating portion constituted by a groove having a recessed shape, extending in the first direction, and formed at the inner bottom surface at a position located in front of the guide, the harness accommodating portion accommodating the harness, wherein the groove having the recessed shape has a first wall that is a vertical wall extending in a vertical direction and the first direction, wherein a frame reinforcement is formed on the inner bottom surface of the support frame at a position adjacent to the harness accommodating portion and nearer to the guide than the harness accommodating portion, and the frame reinforcement has a groove having a recessed shape which extends in the first direction, wherein the groove having the recessed shape in the harness accommodating portion has the first wall located nearer to the frame reinforcement than another portion of the groove having the recessed shape in the harness accommodating portion, and wherein the frame reinforcement has: a third wall that is a vertical wall extending in the first direction, opposed to the first wall, and located in the recessed shape of the groove of the frame reinforcement at a position nearer to the guide than another portion of the recessed shape of the groove of the frame reinforcement; and a fourth wall extending from the first wall to the third wall; an image forming device disposed below the reading device; and a sheet-output portion disposed below the frame reinforcement and configured to support a recording sheet on which recording has been performed by the image forming device. A plurality of sheet-output guides arranged in the first direction are formed on a lower surface of the frame reinforcement. Each of the plurality of sheet-output guides has a protruding shape and extends in a front and rear direction.

In yet another aspect of the disclosure, an image forming apparatus includes: an image reading apparatus including (a) a platen glass having an upper surface and a lower surface as opposite surfaces, the upper surface being configured to support a document, (b) a support frame supporting a peripheral portion of the platen glass, (c) a reading device reciprocable in a first direction and disposed on an inner side of the support frame so as to be nearer to the lower surface of the platen glass than to the upper surface of the platen glass, (d) a guide formed on an inner bottom surface on the inner side of the support frame and extending in the first direction so as to guide reciprocation of the reading device, (e) a controller configured to control operations of the reading device, (f) a harness connecting the reading device and the controller to each other, and (g) a harness accommodating portion constituted by a groove having a recessed shape, extending in the first direction, and formed at the inner bottom surface at a position located in front of the guide, the harness accommodating portion accommodating the harness; and an image forming device disposed below the reading device. The reading device is disposed on a front side of a position just above the image forming device.

BRIEF DESCRIPTION OF THE DRAWINGS

The objects, features, advantages, and technical and industrial significance of the present disclosure will be better understood by reading the following detailed description of the embodiments, when considered in connection with the accompanying drawings, in which.

EMBODIMENTS

Hereinafter, there will be described embodiments by reference to the drawings. It is to be understood that the following embodiments are described only by way of example, and the disclosure may be otherwise embodied with various modifications without departing from the scope and spirit of the disclosure.

First Embodiment

First, a first embodiment will be described. FIGS. 1-7 illustrate arrows indicating up, down, right, left, front, and rear sides of an image forming apparatus 1. It is noted that the right and left sides of the image forming apparatus 1 are right and left sides in the case where the image forming apparatus 1 is viewed from a user located in front of the image forming apparatus 1.

Figure 1:
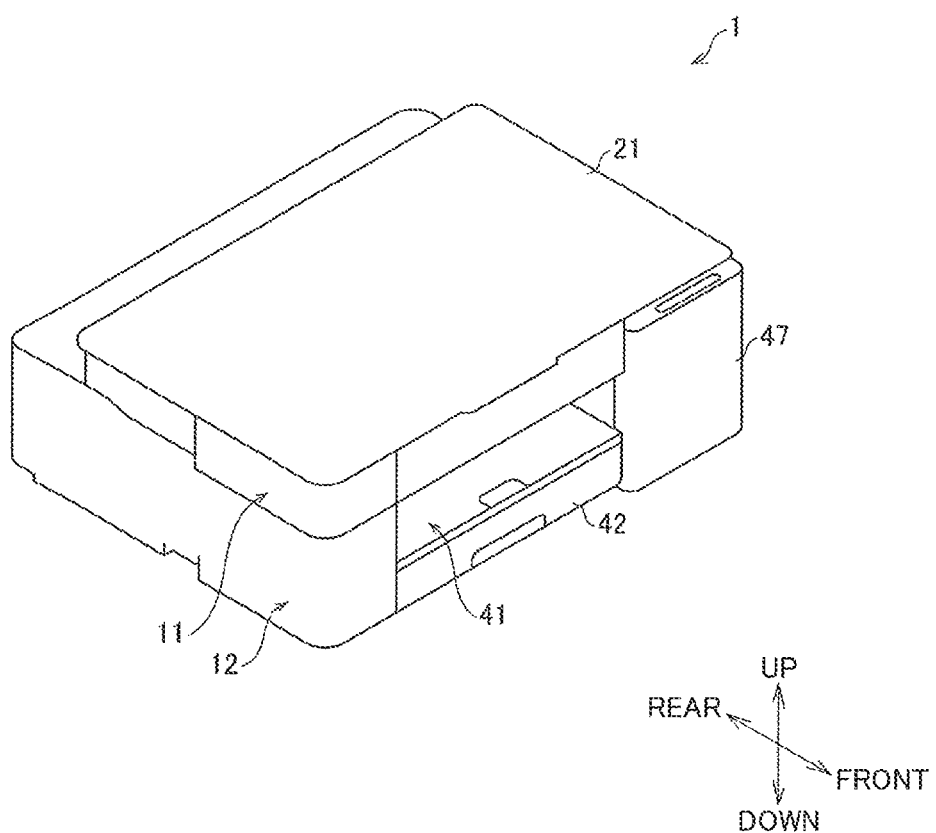
FIG. 1 is a perspective view of an image forming apparatus according to one embodiment.
Figure 2:
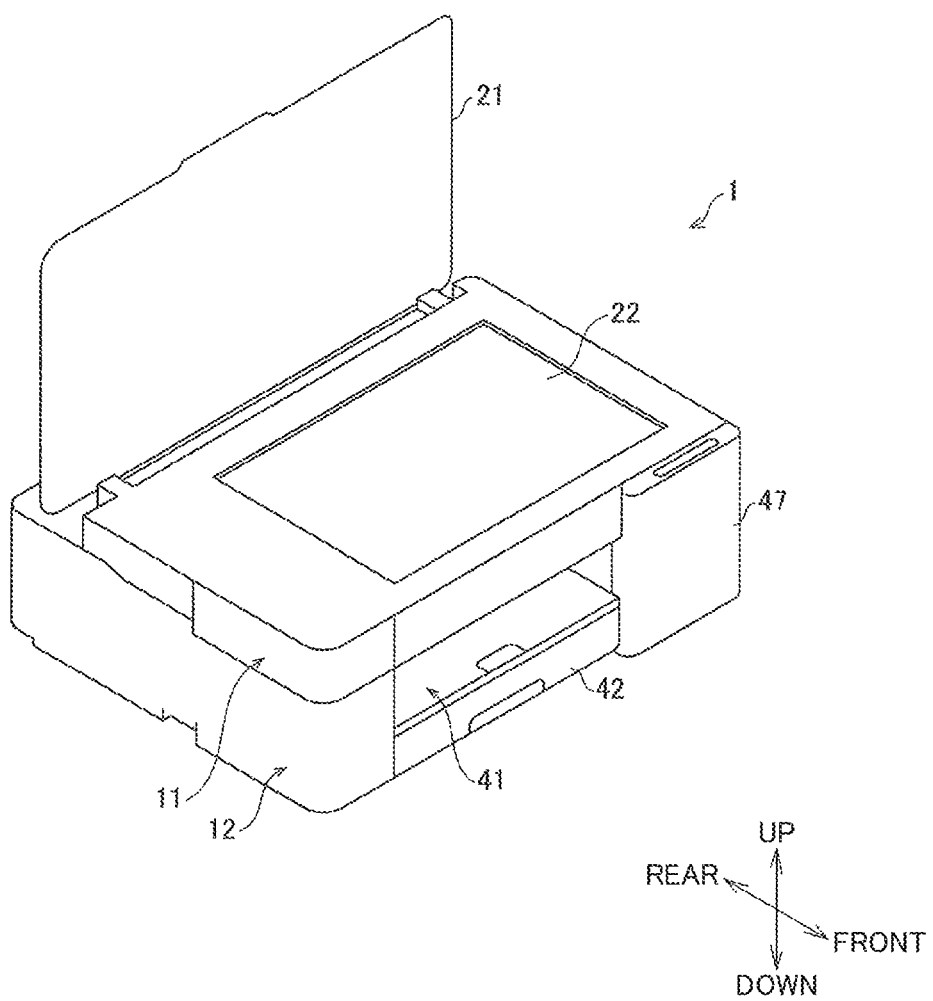
FIG. 2 is a perspective view of the image forming apparatus, illustrating a state in which a document-table cover of the image forming apparatus illustrated in FIG. 1 is opened.
Figure 3:
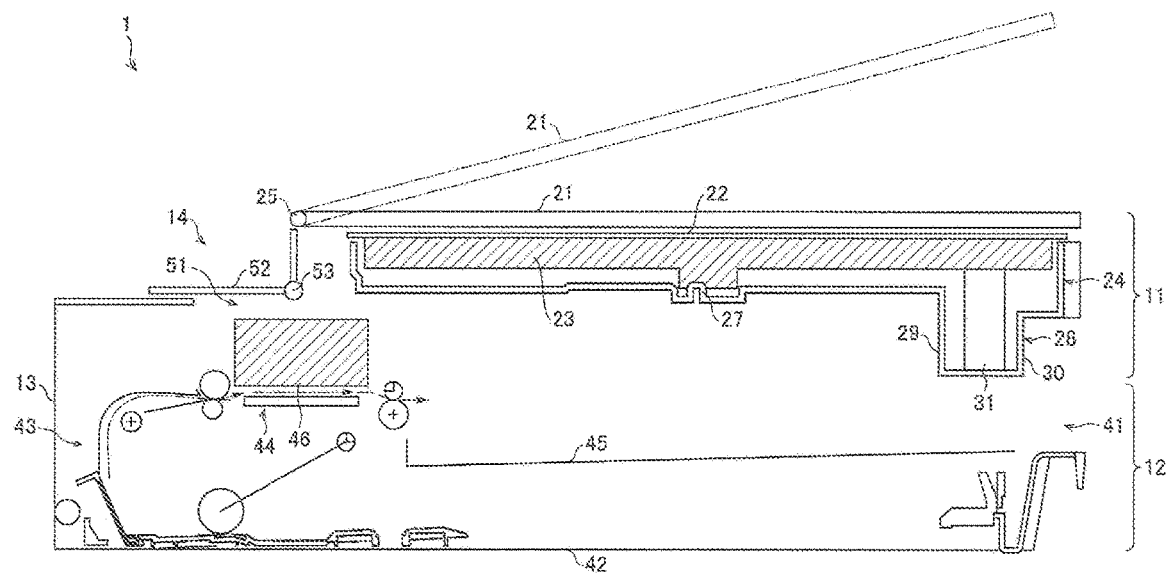
FIG. 3 is an elevational view in vertical cross section, illustrating the image forming apparatus illustrated in FIG. 1.
Figure 3:
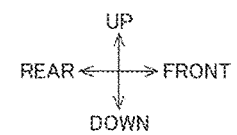

As illustrated in FIGS. 1-3, the image forming apparatus 1 at its upper portion includes a scanner unit 11 as one example of an image reading apparatus and at its lower portion includes a printer unit 12.

Scanner Unit 11

As illustrated in FIG. 3, the scanner unit 11 includes a document-table cover 21, a platen glass 22, a reading device 23, and a support frame 24 arranged in this order from an upper side of the scanner unit 11.

The document-table cover 21 is mounted on the support frame 24 by hinges 25 provided at a rear end portion of the document-table cover 21. This configuration allows the document-table cover 21 to be opened and closed with respect to the platen glass 22. The platen glass 22 has a substantially rectangular shape, and its upper surface serves as a document table. The reading device 23 includes an image sensor such as a contact image sensor (CIS). The reading device 23 is configured to reciprocate in the right and left direction under the platen glass 22. During this reciprocation, the image sensor reads an image formed on a document placed on the platen glass 22, and the reading device 23 converts the image to an image signal.

The support frame 24 is formed of resin such as acrylonitrile butadiene styrene (ABS) resin or high impact polystyrene (HIPS), for example. An outer circumferential portion of the support frame 24 supports an outer circumferential portion of the platen glass 22. It is noted that the support frame 24 of the scanner unit 11 is coupled to support members including a housing 13 of the image forming apparatus 1 illustrated in FIG. 3 and is supported by these support members.

Figure 4:
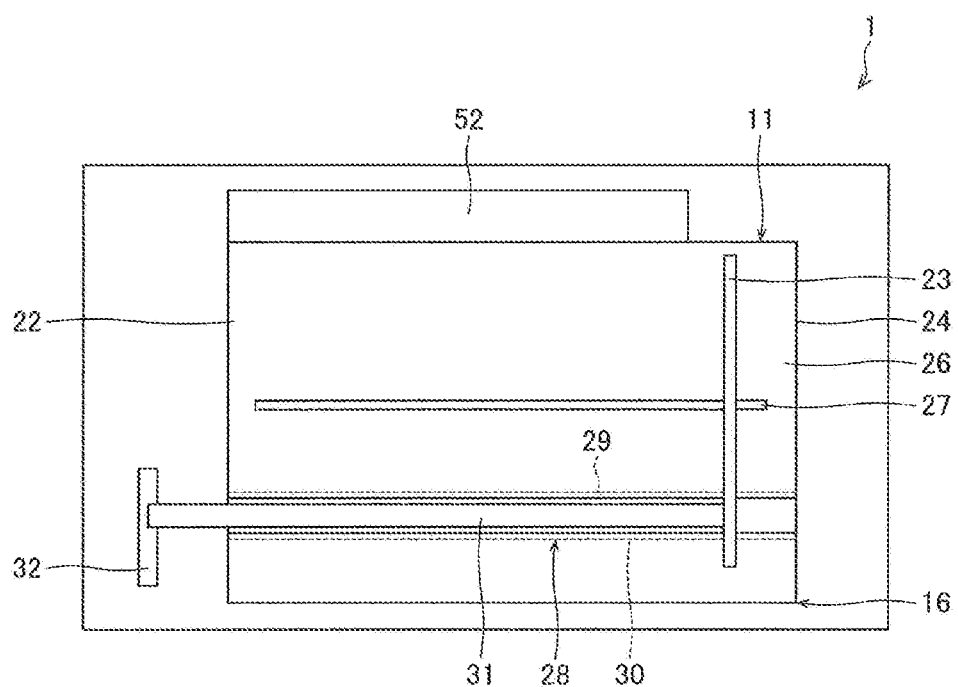
FIG. 4 is a schematic plan view of the image forming apparatus, illustrating a state in which the document-table cover of the image forming apparatus illustrated in FIG. 1 is removed, and a platen glass is assumed to be transparent.
Figure 4:
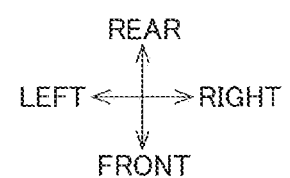

The support frame 24 has an inner bottom surface 26 on an inner side of the outer circumferential portion of the support frame 24, and the inner bottom surface 26 extends in the horizontal direction. As illustrated in FIG. 4, a guide 27 is formed near a central portion of the inner bottom surface 26 in the front and rear direction. The guide 27 is shaped like a rail extending in the right and left direction. The guide 27 guides movement of the reading device 23 in the right and left direction in the reading operation.

A harness accommodating portion 28 is formed in front of the guide 27 of the inner bottom surface 26. The harness accommodating portion 28 has a recessed groove extending in the right and left direction. The support frame 24 supporting the platen glass 22 has increased stiffness by including the harness accommodating portion 28 in the inner bottom surface 26. Thus, in the case where the scanner unit 11 reads a particular page of a document such as a book, even when the document is pressed against the platen glass 22, the support frame 24 is capable of supporting the platen glass 22 due to its high stiffness.

The harness accommodating portion 28 includes a first wall 29 that is a vertical wall extending in the right and left direction and a direction intersecting the platen glass 22, preferably, the vertical direction. This configuration further increases the stiffness of the support frame 24 supporting the platen glass 22 in the scanner unit 11. The recessed groove of the harness accommodating portion 28 includes a second wall 30 that is a vertical wall opposed to the first wall 29 and extending in the right and left direction and a direction intersecting the platen glass 22, preferably, the vertical direction. This configuration further increases the stiffness of the support frame 24 supporting the platen glass 22.

The harness accommodating portion 28 is capable of accommodating a flexible cable in the form of a harness 31. The harness 31 connects the reading device 23 and a controller 32 (see FIG. 4) to each other. The controller 32, for example, is constituted by a control board, provided on a front side of the guide 27, and configured to control operations of the reading device 23. Thus, the controller 32 is provided on a front side of the guide 27, and the harness accommodating portion 28 is formed on a front side of the guide 27 formed at the inner bottom surface 26 on an inner side of the outer circumferential portion of the support frame 24. This configuration reduces the distance between the controller 32 and the harness accommodating portion 28, thereby reducing the length of the harness 31. As illustrated in FIG. 4, the width (the dimension) of the harness 31 in the front and rear direction is less than the distance between the first wall 29 and the second wall 30 in the front and rear direction. This configuration enables the harness accommodating portion 28 to well accommodate the harness 31 without being in strong contact with the first wall 29 and the second wall 30. As illustrated in FIG. 3, the lowermost portion of the support frame 24 defines a bottom portion of the harness accommodating portion 28. That is, a portion of the support frame 24 between the first wall 29 and the second wall 30 serves as the lowermost portion of the support frame 24. This secures the depth of the harness accommodating portion 28 in the up and down direction. Accordingly, the harness accommodating portion 28 can well accommodate the harness 31 in the case where the reading device 23 is located at the position closest to the controller 32 in FIG. 4.

In the scanner unit 11, as illustrated in FIG. 4, the position of a front end of the platen glass 22 serves as a reference position 16 for placement of a document to be read. The stiffness of the support frame 24 is increased by the harness accommodating portion 28 at a front end portion of the platen glass 22. This configuration enables the reading device 23 to stably read a document placed at the reference position 16.

Printer Unit 12

The printer unit 12 includes a sheet supply/output opening 41, a sheet-supply cassette 42, a recording-sheet conveyance path 43, an image recording device 44 as one example of an image forming device, and a sheet-output tray 45.

The sheet supply/output opening 41 is formed in a front surface of the image forming apparatus 1 at a position near the center of the front surface in the up and down direction and the right and left direction. The sheet-supply cassette 42 is capable of containing recording sheets and provided in a bottom portion of the image forming apparatus 1 so as to be removable from and insertable into the image forming apparatus 1. The recording-sheet conveyance path 43 is a path through which the recording sheet is conveyed from the sheet-supply cassette 42 to the image recording device 44 during printing on the recording sheet. The image recording device 44 includes an ink-jet recording head 46 configured to print an image on the recording sheet. The image recording device 44 is provided in a rear portion of the printer unit 12. The sheet-output tray 45 receives the recording sheet discharged from the image recording device 44. It is noted that ink cartridges storing ink to be supplied to the recording head 46 are mounted on a cartridge mount 71 (see FIG. 7) located on an inner side of a cartridge cover 47 illustrated in FIGS. 1 and 2.

The image forming apparatus 1 includes the image recording device 44 provided below the reading device 23. The reading device 23 is provided in front of a position just above the image recording device 44. In the image forming apparatus 1, specifically, a rear end position of the scanner unit 11 does not coincide with a rear end position of the printer unit 12 and is located on a front side of the rear end position of the printer unit 12. Thus, a rear end portion of the image forming apparatus 1 has an empty region 14 above the image recording device 44.

The housing 13 has an opening 51 at the empty region 14. The opening 51 is covered with a cap member 52 openably and closably. The cap member 52 is attached to the housing 13 by hinges 53. This configuration enables the opening 51 to be used for maintenance and check of the image forming apparatus 1, for example.

The harness accommodating portion 28 accommodating the harness 31 and the printer unit 12 overlap each other in the up and down direction, resulting in reduced size of the image forming apparatus 1 in the up and down direction.

Second Embodiment

There will be next described a second embodiment. It is noted that the same reference numerals as used in the first embodiment are used to designate the corresponding elements of the second embodiment, and an explanation of which is dispensed with.

Scanning Unit 15 and Printer Unit 12

Figure 5:
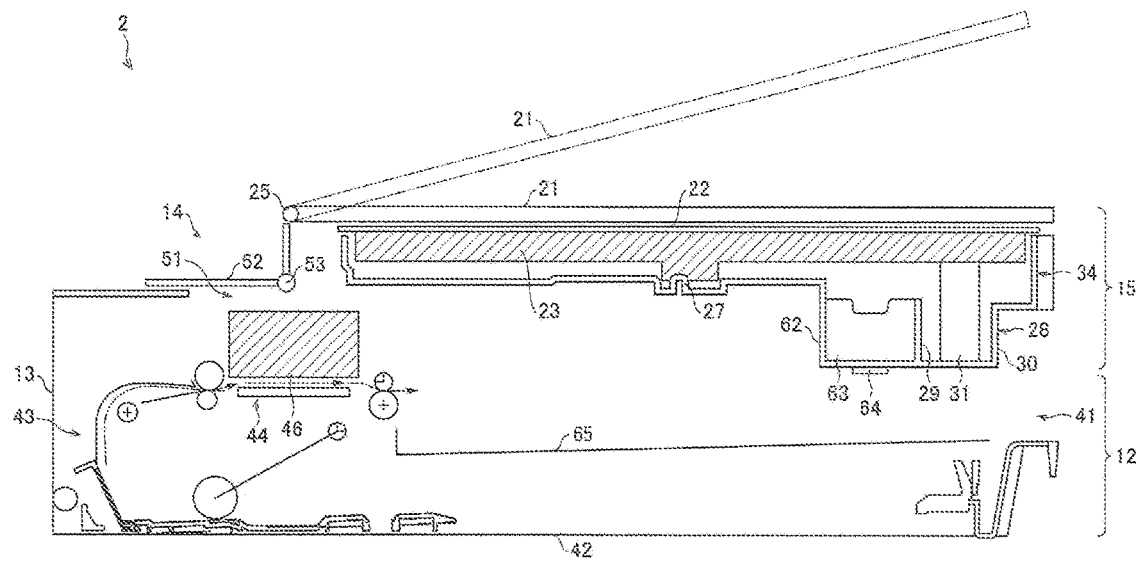
FIG. 5 is an elevational view in vertical cross section, illustrating an image forming apparatus according to another embodiment.
Figure 5:
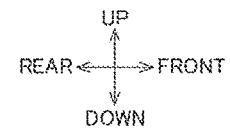
Figure 6:
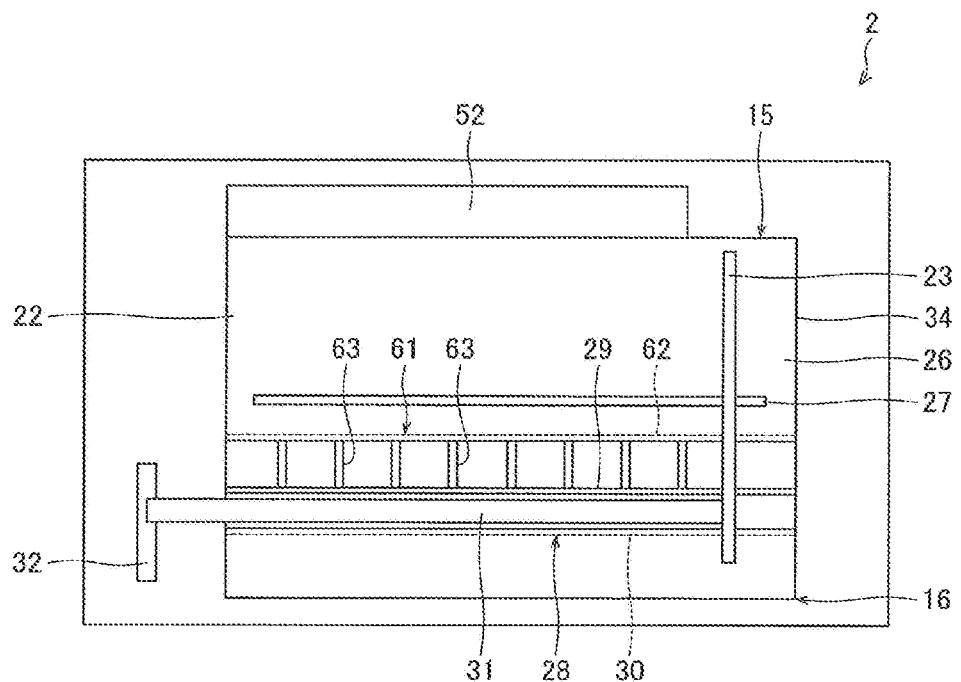
FIG. 6 is a schematic plan view of the image forming apparatus, illustrating a state in which the document-table cover of the image forming apparatus illustrated in FIG. 5 is removed, and the platen glass is assumed to be transparent.
Figure 6:
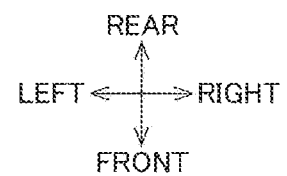
Figure 7:
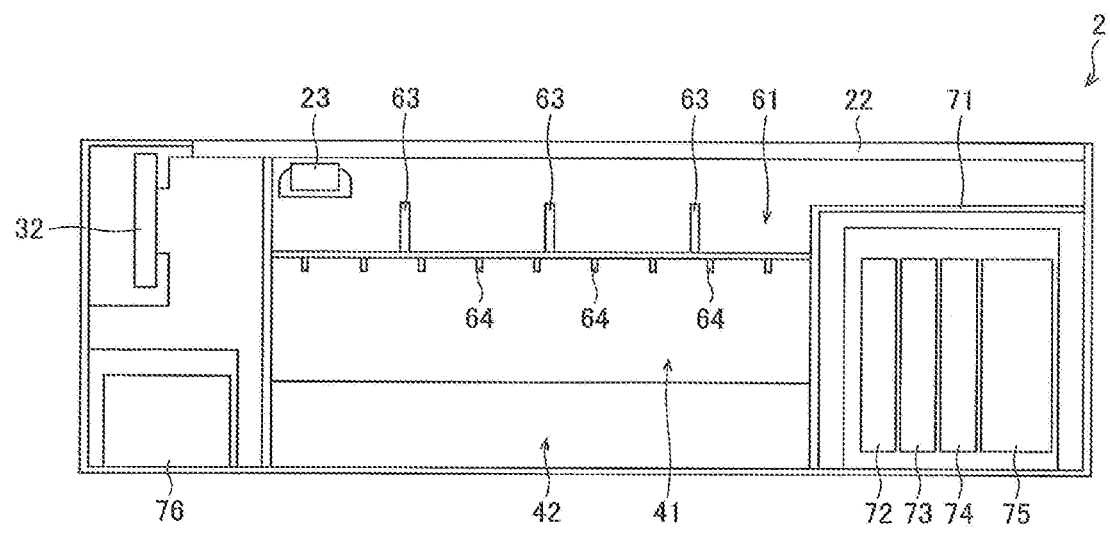
FIG. 7 is a schematic elevational view of the vertical cross section of the image forming apparatus illustrated in FIG. 5 in a direction perpendicular to the cross section in FIG. 5.
Figure 7:
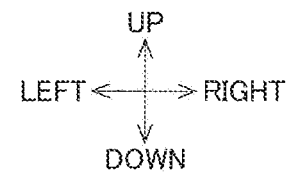

FIGS. 5-7 illustrate an image forming apparatus 2 according to the present embodiment.

As illustrated in FIG. 5, the image forming apparatus 2 according to the present embodiment includes a scanning unit 15 instead of the scanner unit 11 illustrated in FIG. 3. The scanning unit 15 includes a support frame 34 instead of the support frame 24. As illustrated in FIGS. 5 and 6, the scanning unit 15 includes a frame reinforcement 61 that is disposed on the inner bottom surface 26 located on an inner side of the support frame 34 and that is adjacent to the harness accommodating portion 28 and nearer to the guide 27 than the harness accommodating portion 28. The other configuration of the support frame 34 is similar to that of the support frame 24.

The frame reinforcement 61 has a recessed groove extending in the right and left direction. The recessed groove of the harness accommodating portion 28 has the first wall 29 located near the frame reinforcement 61. The frame reinforcement 61 includes: a third wall 62 that is a vertical wall located near the guide 27 on the recessed shape of the frame reinforcement 61, extending in the right and left direction and a direction intersecting the platen glass 22, preferably, the vertical direction, and opposed to the first wall 29 of the harness accommodating portion 28; and fourth walls 63 each extending from the first wall 29 to the third wall 62. With this configuration, the support frame 34 has high stiffness due to the frame reinforcement 61, when compared with the support frame 24.

The image forming apparatus 2 includes the image recording device 44 as one example of the image forming device which is located below the reading device 23 of the scanner unit 11. The image forming apparatus 2 is provided with a sheet-output tray 65 as one example of a sheet-output portion which is located below the frame reinforcement 61. The recording sheet with an image recorded thereon by the image recording device 44 is discharged onto the sheet-output tray 65. As illustrated in FIGS. 5 and 7, the frame reinforcement 61 includes a plurality of sheet-output guides 64 arranged on a lower surface of the frame reinforcement 61. The sheet-output guides 64 are arranged in the right and left direction. Each of the sheet-output guides 64 extends in the front and rear direction and has a downwardly protruding shape. In the printer unit 12, i.e., the image forming apparatus 2, this configuration enables the sheet-output guides 64 to guide the recording sheet to the sheet-output tray 65 while pressing an upper surface of the recording sheet being discharged from the image recording device 44 onto the sheet-output tray 65. This reduces occurrences of a jam of the recording sheet at the sheet-output guides 64.

It is noted that, as illustrated in FIG. 7, the cartridge mount 71 is provided at a right end portion of a front portion of the image forming apparatus 2. A cyan-ink tank 72, a magenta-ink tank 73, a yellow-ink tank 74, and a black-ink tank 75 are mounted on the cartridge mount 71 in this order from the left side toward the right side. The image forming apparatus 2 includes a power source 76 at a lower portion of a left end portion of the image forming apparatus 2.

What is claimed is:

1. An image reading apparatus, comprising:
   a platen glass comprising an upper surface and an opposed lower surface as opposite surfaces, the upper surface being configured to support a document;
   a support frame supporting a peripheral portion of the platen glass;
   a reading device reciprocable in a first direction and disposed on an inner side of the support frame so as to be nearer to the lower surface of the platen glass than to the upper surface of the platen glass;
   an upward-protruding portion extending upwardly from an inner bottom surface of the support frame and engaging with a recessed portion formed on a lower surface of the reading device, the upward-protruding portion extending in the first direction so as to guide reciprocation of the reading device;
   a controller configured to control operations of the reading device;
   a harness connecting the reading device and the controller to each other; and
   a harness accommodating portion constituted by a groove having a recessed shape, extending in the first direction, and formed at the inner bottom surface of the support frame, the harness accommodating portion accommodating the harness and being located at a position spaced apart from the upward-protruding portion in a second direction orthogonal to the first direction,
   wherein the groove having the recessed shape comprises
   a first wall extends in the first direction and protrudes upward from a bottom portion of the harness accommodating portion,
   a second wall extending in the first direction and protruding upward from the bottom portion of the harness accommodating portion at a position spaced apart from the first wall in a direction directed from the upward-protruding portion toward the harness accommodating portion, the second wall being opposed to the first wall so that the harness is interposed between the first wall and the second wall,
   a third wall extending in the first direction and protruding upward from the bottom portion of the harness accommodating portion at a position spaced apart from the first wall in a direction directed from the harness accommodating portion toward the upward-protruding portion, the third wall being opposed to the first wall so that the harness is not interposed between the first wall and the third wall, and
   a plurality of fourth walls respectively extending in an orthogonal direction orthogonal to the first direction in which the first wall and the third wall extend and protruding upward from the bottom portion of the harness accommodating portion, the plurality of fourth walls respectively extending from the third wall to the first wall in a state in which two adjacent walls of the plurality of fourth wall are spaced apart from each other in the first direction.

2. The image reading apparatus according to claim 1, wherein a dimension of the harness in the second direction is less than a distance between the first wall and the second wall in the second direction.

3. The image reading apparatus according to claim 1, wherein the lowermost portion of the support frame defines a bottom portion of the harness accommodating portion.

4. The image reading apparatus according to claim 1, wherein a position of an end portion of the platen glass in the second direction is a reference position for placement of a document to be read and is located closer to the harness accommodating portion than to the upward-protruding portion which guides reciprocation of the reading device.

5. An image forming apparatus, comprising:
   an image reading apparatus comprising
      (a) a platen glass comprising an upper surface and an opposed lower surface, the upper surface being configured to support a document,
      (b) a support frame supporting a peripheral portion of the platen glass,
      (c) a reading device reciprocable in a first direction and disposed on an inner side of the support frame so as to be nearer to the lower surface of the platen glass than to the upper surface of the platen glass,
      (d) an upward-protruding portion extending upwardly from an inner bottom surface on the inner side of the support frame and engaging with a recessed portion formed on a lower surface of the reading device, the upward-protruding portion extending in the first direction so as to guide reciprocation of the reading device,
      (e) a controller configured to control operations of the reading device,
      (f) a harness connecting the reading device and the controller to each other, and
      (g) a harness accommodating portion constituted by a groove having a recessed shape, extending in the first direction, and formed at the inner bottom surface of the support frame, the harness accommodating portion accommodating the harness and being located at a position spaced apart from the upward-protruding portion in a second direction orthogonal to the first direction,
   an image forming device disposed below the reading device; and
   a sheet-output portion disposed below the groove and configured to support a recording sheet on which recording has been performed by the image forming device,
   wherein a plurality of sheet-output guides arranged in the first direction are formed on a lower surface of a bottom portion of the harness accommodating portion, and each of the plurality of sheet-output guides has a protruding shape and extends in the second direction, and
   wherein the groove having the recessed shape comprises
      a first wall extends in the first direction and protrudes upward from the the bottom portion of the harness accommodating portion,
      a second wall extending in the first direction and protruding upward from the bottom portion of the harness accommodating portion at a position spaced apart from the first wall in a direction directed from the upward-protruding portion toward the harness accommodating portion, the second wall being opposed to the first wall so that the harness is interposed between the first wall and the second wall,
      a third wall extending in the first direction and protruding upward from the bottom portion of the harness accommodating portion at a position spaced apart from the first wall in a direction directed from the harness accommodating portion toward the upward-protruding portion, the third wall being opposed to the first wall so that the harness is not interposed between the first wall and the third wall, and a plurality of fourth walls respectively extending in an orthogonal direction orthogonal to the first direction in which the first wall and the third wall extend and protruding upward from the bottom portion of the harness accommodating portion, the plurality of fourth walls respectively extending from the third wall to the first wall in a state in which two adjacent walls of the plurality of fourth wall are spaced apart from each other in the first direction.

6. The image reading apparatus according to claim 1, wherein both the controller and the harness accommodating portion are disposed at positions closer to a first end of the platen glass than the upward-protruding portion in the second direction.

7. The image reading apparatus according to claim 1, wherein the controller is disposed at a position on an extension line lying on the harness accommodating portion.

8. The image forming apparatus according to claim 5, wherein the harness accommodating portion is located closer to a reference position of the platen glass, which is an end portion of the platen glass in the second direction, than the upward-protruding portion in the second direction, and
wherein the reference position serves to place a document to be read on the platen glass.

9. The image forming apparatus according to claim 5, wherein both the controller and the harness accommodating portion are disposed at positions closer to a first end of the platen glass than the upward-protruding portion in the second direction.

* * * * *